United States Patent [19]
Keane

[11] Patent Number: 6,085,507
[45] Date of Patent: Jul. 11, 2000

[54] LAWNMOWER-ATTACHED EDGE TRIMMER APPARATUS

[76] Inventor: Stephen Timothy Keane, 36 Castlewood Park, Ennis, Co Clare, Ireland

[21] Appl. No.: 09/228,161

[22] Filed: Jan. 11, 1999

Related U.S. Application Data

[62] Division of application No. 08/719,658, Sep. 25, 1996, Pat. No. 5,857,315.

[51] Int. Cl.⁷ .................................................. A01D 34/84
[52] U.S. Cl. .............................. 56/16.9; 56/17.1; 56/256; 56/320.1; 56/DIG. 20; 56/DIG. 17; 172/14; 172/15
[58] Field of Search ................................. 56/16.9, 171.1, 56/256, 320.1, DIG. 17, DIG. 20; 172/13–15

[56] References Cited

U.S. PATENT DOCUMENTS

| | | | |
|---|---|---|---|
| 3,006,127 | 10/1961 | Becker | 56/16.9 X |
| 3,686,839 | 8/1972 | Lambert | 56/16.9 X |
| 3,789,591 | 2/1974 | Emery | 56/16.9 |
| 4,378,668 | 4/1983 | Gullett . | |
| 4,551,967 | 11/1985 | Murcko | 56/17.1 X |
| 4,718,221 | 1/1988 | Wessel et al. | 56/16.9 |
| 5,572,856 | 11/1996 | Ku | 56/16.9 X |

*Primary Examiner*—Christopher J. Novosad

[57] ABSTRACT

An auxiliary edge trimmer apparatus is attached to a lawnmower and includes a flywheel drive wheel portion connected to the lawnmower drive shaft. An attachment assembly is connected onto portions of the lower housing wall of the blade housing of the lawnmower. A trimmer assembly is attached to the attachment assembly and includes a bearing portion connected to the attachment assembly, a rotatable shaft assembly received by the bearing portion, a driven wheel connected to a proximal end of the rotatable shaft assembly, and a trimmer blade connected to a distal end of the rotatable shaft assembly. In accordance with an alternatively preferred embodiment of the invention, a manually actuatable control cable is suitably attached to the drive shaft supported on the lawnmower housing between the drive wheel and the auxiliary trimmer apparatus to control engagement and disengagement thereof. Additionally, angular orientation adjustment of the auxiliary trimmer assembly relative to the main rotation shaft axis of the lawnmower is provided to assure precise control of the width of cut afforded by the auxiliary trimmer apparatus.

1 Claim, 10 Drawing Sheets

LAWNMOWER-ATTACHED EDGE TRIMMER APPARATUS

RELATED APPLICATION

This application is a divisional application of my co-pending prior application Ser. No. 08/719,658, filed Sep. 25, 1996 now U.S. Pat. No. 5,857,315.

BACKGROUND OF THE INVENTION

1. Field of the Invention

The present invention relates generally to powered edge trimmer devices and, more particularly, to edge trimmer devices attached to power lawnmowers.

2. Description of the Prior Art

When grass is cut, it is often desirable to trim edges of sidewalks, driveways, and the like. Currently, three types of edge trimmers are known in the prior art: a first has manually operated blades; a second has a power-driven blade in a separate and distinct edge trimmer device; and a third employs an edge trimmer device in conjunction with a power-driven lawnmower. With particular attention being paid to the edge trimmers associated with power-driven lawnmowers, throughout the years, a number of innovations have been developed, and the following U.S. patents are representative of some of those innovations: 3,686,839; 3,789,591; 4,378,668; 4,551,967; and 4,718,221. More specifically, each of U.S. Pat. Nos. 3,686,839 and 4,551,967 discloses an edge trimmer associated with a lawnmower wherein the edge trimmer is powered by the lawnmower by using a drive belt. It is well known that drive belts stretch and crack with age. Moreover, the drive belt must be used with accompanying pulleys. To eliminate the complexities associated with the use of drive belts, it would be desirable if a lawnmower-attached edge trimmer device could operate without using a drive belt.

U.S. Pat. No. 3,789,591 discloses a power lawnmower having an auxiliary flexible drive shaft for an edger head. A separate and distinct drive disk is provided above the lawnmower blade on the drive shaft. A spring-biased driven friction wheel is selectively placed in frictional contact with the drive disk. The friction wheel itself is part of an assembly which is pivotally connected to the body of the lawnmower. To avoid the use of a spring (which may fatigue) and to avoid the use of a pivoted connection (which may need regular lubrication), it would be desirable if a lawnmower-powered edge trimmer does not operate by using a spring or a pivoted connection assembly.

U.S. Pat. No. 4,378,668 discloses a lawnmower-powered edge trimmer which employs a plurality of whip blades which are kept in constant motion even when the blades are not being used for trimming. When retractable guards are retracted, the whip blades are permitted to extend outward to be used for trimming. When the retractable guards are returned to their original positions, the whip blades are once again prevented from trimming. It is wasteful of energy to keep whip blades in constant rotation even when they are not being used for trimming. For this reason, it would be desirable if a lawnmower-powered edge trimmer does not employ trimmer blades that are in constant motion, even when the trimmer blades are not being used for trimming.

U.S. Pat. No. 4,718,221 an edger and trimmer that is carried by a lawnmower body, but the lawnmower engine does not power the cutting action of the edger and trimmer. More specifically, a cutting disk that is selectively raised or lowered by an operator. When the cutting disk is raised, it does not contact the ground. However, when the cutting disk is lowered, the cutting disk contacts the ground and trims the grass as a result of the lawnmower being pushed along the ground by an operator. No power is tapped from the lawnmower engine to be sent to the cutting blades. Some grass will not readily be cut by a relatively slow moving cutting disk as described above that is not powered by the lawnmower engine.

Still other features would be desirable in a lawnmower-attached edge trimmer apparatus. For example, there are many lawnmowers currently in use that do not contain edge trimmer features. In this respect, it would be desirable if a conventional lawnmower could be retrofitted to provide a lawnmower-powered edge trimmer. With respect to retrofitting, conventional lawnmowers come in a variety of sizes. More specifically, the circumferences of the housings for the cutting blades of lawnmowers may differ from one lawnmower to another. In this respect, it would be desirable if a lawnmower-attached edge trimmer apparatus that is retrofitted to a lawnmower could be adjusted to a variety of sizes of lawnmower housings.

Thus, while the foregoing body of prior art indicates it to be well known to use lawnmower-attached edge trimmer devices, the prior art described above does not teach or suggest a lawnmower-attached edge trimmer apparatus which has the following combination of desirable features: (1) does not employ trimmer blades that are in constant motion, even when the trimmer blades are not being used for trimming; (2) can be retrofitted to a conventional lawnmower; (3) can be adjusted to a variety of sizes of lawnmower housings; (4) has a manually controlable connect/disconnect between the attached auxilliary trimmer apppartus and the main lawnmower drive; and (5) includes easy adjustment of the angular orienetation of the attached trimmer cutting blades or filaments to conveniently control the width of cut of the auxilliary cutting apparatus. The foregoing desired characteristics are provided by the unique lawnmower-attached edge trimmer apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an edge trimmer apparatus attached to a lawnmower which has a drive shaft and which has a blade housing having a lower housing wall, wherein the drive shaft rotates around a longitudinal axis. The lawnmower-attached edge trimmer apparatus includes a combined flywheel and blade assembly which includes a flywheel portion connected to the lawnmower drive shaft. A plurality of blade members extend radially out from the flywheel portion. An attachment assembly is connected onto portions of the lower housing wall of the blade housing. A trimmer assembly is attached to the attachment assembly. The trimmer assembly includes a bearing portion connected to the attachment assembly, a rotatable shaft assembly received by the bearing portion, a driven wheel connected to a proximal end of the rotatable shaft assembly, and a trimmer blade connected to a distal end of the rotatable shaft assembly. A protective shroud is connected to the attachment assembly.

The rotatable shaft assembly is adjustable along its longitudinal axis. More specifically, the rotatable shaft assembly includes a first segment which carries the driven wheel. A second segment of the rotatable shaft assembly carries the trimmer blade. A length-adjustment assembly is connected between the first segment and the second segment.

The blade members lie in a blade plane. The flywheel portion includes a driving surface which lies in a driving plane. The driving plane is spaced apart from the blade plane longitudinally along the longitudinal axis by a clearance distance.

The attachment assembly includes a first clamp assembly attachable to a first portion of the lower housing wall of the blade housing. The first clamp assembly includes a first U-shaped bracket member which slips over a portion of the lower housing wall of the blade housing. A set of nuts and bolts connect the first U-shaped bracket member to the lower housing wall. The first U-shaped bracket member includes a pair of bearing-receiving apertures for receiving the bearing portion of the rotatable shaft assembly.

The attachment assembly can further include a second clamp assembly attached to a second portion of the lower housing wall of the blade housing. An adjustable-length strut assembly can be connected between the first clamp assembly. The second clamp assembly includes a second U-shaped bracket member which slips over a portion of the lower housing wall of the blade housing. A set of nuts and bolts for connect the second U-shaped bracket member to the lower housing wall.

The adjustable-length strut assembly includes a pair of first telescopic members connected to the first clamp assembly and a pair of second telescopic members connected to the second clamp assembly.

In accordance with additional embodiments of the invention, the edge trimmer apparatus includes a drive member supported by the drive shaft above the blade housing. A power transmission assembly is connected to the drive member and is supported by the blade housing. A trimmer blade unit is supported by and driven by the power transmission assembly.

In accordance with another embodiment of the invention, the drive member can be a drive pulley supported by the drive shaft. The power transmission assembly includes a gear-containing transmission unit supported by the lower housing wall of the blade housing. An endless belt is connected between the drive pulley and the gear-containing transmission unit, and a trimmer blade unit is supported by and driven by the gear-containing transmission unit. The gear-containing transmission unit includes a first bevel gear assembly connected to the lower housing wall of the blade housing. The first bevel gear assembly supports and drives the trimmer blade unit. A pulley/gear transmission support bracket is supported by the first bevel gear assembly. The pulley/gear transmission support bracket includes a vertical first bracket portion and a horizontal second bracket portion. The vertical first bracket portion is connected to the first bevel gear assembly. A driven pulley is supported in an overhead manner by the horizontal second bracket portion of the pulley/gear transmission support bracket. A gear-driving shaft is connected to the driven pulley, and a second bevel gear assembly is connected to the gear-driving shaft. The second bevel gear assembly is enmeshed with the first bevel gear assembly.

The first bevel gear assembly includes a bearing portion connected to the lower housing wall of the blade housing. A gear shaft portion is retained by the bearing portion and supports the trimmer blade unit. A first bevel gear is supported by the gear shaft portion. A protective shroud is connected to the vertical first bracket portion of the pulley/gear transmission support bracket.

In accordance with another embodiment of the invention, the drive member can be a ring gear. In this case, the power transmission assembly includes a longitudinal drive shaft assembly supported by the blade housing. The longitudinal drive shaft assembly includes a geared end enmeshed with the ring gear. A shaft portion extends horizontally from the geared end, and a coupler end is located at a distal end of the shaft portion. The coupler end is connected to the trimmer blade unit. A bearing jacket jackets the shaft portion of the longitudinal drive shaft assembly. Jacket-support brackets support the bearing jacket and are supported by the blade housing. The coupler end of the longitudinal drive shaft assembly includes a well portion.

In accordance with another embodiment of the invention, the trimmer blade unit includes a blade, a rigid key-carrying portion is connected to the blade, and a key portion is received in the well portion of the longitudinal drive shaft assembly. The rigid key-carrying portion includes external threads. A threaded lock nut is supported by the bearing jacket and engages the external threads of the rigid key-carrying portion of the trimmer blade unit for locking the longitudinal drive shaft assembly to the trimmer blade unit. A spring assembly can be placed between the trimmer blade unit and the longitudinal drive shaft assembly for urging the trimmer blade unit toward the longitudinal drive shaft assembly.

In accordance with another embodiment of the invention, the trimmer blade unit includes a blade, a blade-retaining shaft supports the blade, and a shaft-bearing assembly supports the blade-retaining shaft. A flexible power cable assembly is connected to the blade-retaining shaft for connection to the longitudinal drive shaft assembly. A hinged trimmer-unit-support assembly is connected to the lower housing wall of the blade housing and supports the shaft-bearing assembly. The blade lies in a blade plane.

The flexible power cable assembly includes a proximal end connected to the blade-retaining shaft. A flexible cable portion is connected to the proximal end, and a key portion is connected to the flexible cable portion. The key portion is received in the well portion of the longitudinal drive shaft assembly. The longitudinal length of the well portion of the shaft portion of the longitudinal drive shaft assembly is equal to or greater than the combined length of the key portion and the flexible cable portion of the flexible power cable assembly.

The hinged trimmer-unit-support assembly includes a fixed support member connected to the lower housing wall of the blade housing, a movable support member that supports the shaft-bearing assembly, and a hinge pin connecting the fixed support member and the movable support member together, whereby the movable support member can be rotated around the fixed support member. An orientation lock is connected between the fixed support member and the movable support member for locking the fixed support member and the movable support member at a selected angular orientation.

In accordance with yet another embodiment of the invention, a manually actuatable control cable is attached through suitable means to the drive shaft supported on the lawnmower housing between the drive wheel and the auxiliary trimmer apparatus to control engagement and disengagement thereof. Additionally, angular orientation adjustment means for the auxiliary trimmer assembly relative to the main rotation shaft axis of the lawnmower are provided to assure precise control of the width of cut afforded by the auxiliary trimmer apparatus.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining several preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lawnmower-attached edge trimmer apparatus which has all of the advantages of the prior art and none of the disadvantages.

It is another object of the present invention to provide a new and improved lawnmower-attached edge trimmer apparatus which may be easily and efficiently manufactured and marketed.

It is a further object of the present invention to provide a new and improved lawnmower-attached edge trimmer apparatus which is of durable and reliable construction.

An even further object of the present invention is to provide a new and improved lawnmower-attached edge trimmer apparatus which is susceptible of a low cost of manufacture with regard to both materials and labor, and which accordingly is then susceptible of low prices of sale to the consuming public, thereby making such lawnmower-attached edge trimmer apparatus available to the buying public.

Still yet a further object of the present invention is to provide a new and improved lawnmower-attached edge trimmer apparatus which can operate without using a drive belt.

Still another object of the present invention is to provide a new and improved lawnmower-attached edge trimmer apparatus that does not operate by using a spring or a pivoted connection assembly.

Yet another object of the present invention is to provide a new and improved lawnmower-attached edge trimmer apparatus which does not employ trimmer blades that are in constant motion, even when the trimmer blades are not being used for trimming.

Even another object of the present invention is to provide a new and improved lawnmower-attached edge trimmer apparatus that can be retrofitted to a conventional lawnmower.

Still a further object of the present invention is to provide a new and improved lawnmower-attached edge trimmer apparatus which can be adjusted to a variety of sizes of lawnmower housings.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENTS

With reference to the drawings, a number of embodiments of a new and improved lawnmower-attached edge trimmer apparatus embodying the principles and concepts of the present invention will be described.

Turning to FIGS. 1–5, there is shown a first embodiment of the lawnmower-attached edge trimmer apparatus of the invention generally designated by reference numeral 10. In its preferred form, lawnmower-attached edge trimmer apparatus 10 includes is attached to a lawnmower 11 which has a drive shaft 12 and which has a blade housing 13 having a lower housing wall 17. The drive shaft 12 rotates around a longitudinal axis 15. A combined flywheel and blade assembly 14 includes a flywheel portion 16 connected to the lawnmower drive shaft 12, and a plurality of blade members 18 extend radially out from the flywheel portion 16. An attachment assembly is connected onto portions of the lower housing wall 17 of the blade housing 13. A trimmer assembly is attached to the attachment assembly. The trimmer assembly includes a bearing portion 34 connected to the attachment assembly, a rotatable shaft assembly 36 received by the bearing portion 34, a driven wheel 38 connected to a proximal end 40 of the rotatable shaft assembly 36, and a trimmer blade unit 42 connected to a distal end 44 of the rotatable shaft assembly 36. A protective shroud 46 is connected to the attachment assembly.

The rotatable shaft assembly 36 is adjustable along its longitudinal axis 48. More specifically, the rotatable shaft assembly 36 includes a first segment 50 which carries the driven wheel 38. A second segment 52 of the rotatable shaft assembly 36 carries the trimmer blade unit 42. A length-adjustment assembly 54 is connected between the first segment 50 and the second segment 52.

The blade members 18 lie in a blade plane 22. The flywheel portion 16 includes a driving surface 20 which lies in a driving plane 24. The driving plane 24 is spaced apart from the blade plane 22 longitudinally along the longitudinal axis 15 by a clearance distance 26.

The attachment assembly includes a first clamp assembly 33 attachable to a first portion of the lower housing wall 17 of the blade housing 13. The first clamp assembly 33 includes a first U-shaped bracket member 35 which slips over a portion of the lower housing wall 17 of the blade housing 13. A set of nuts 37 and bolts 39 connect the first U-shaped bracket member 35 to the lower housing wall 17. The first U-shaped bracket member 35 includes a pair of bearing-receiving apertures 41 for receiving the bearing portion 34 of the rotatable shaft assembly 36.

The attachment assembly can further include a second clamp assembly 56 attached to a second portion of the lower housing wall 17 of the blade housing 13. An adjustable-length strut assembly 58 can be connected between the first clamp assembly 33. The second clamp assembly 56 includes a second U-shaped bracket member 57 which slips over a portion of the lower housing wall 17 of the blade housing 13. A set of nuts 59 and bolts 61 for connect the second U-shaped bracket member 57 to the lower housing wall 17.

The adjustable-length strut assembly 58 includes a pair of first telescopic members 60 connected to the first clamp assembly 33 and a pair of second telescopic members 62 connected to the second clamp assembly 56.

To retrofit a lawnmower 11 with the lawnmower-attached edge trimmer apparatus 10 of the invention. An original lawnmower blade is first removed from the drive shaft 12 of the lawnmower 11. Then, the combined flywheel and blade assembly 14 is attached to the drive shaft 12 and is secured thereto by washer 63 and a nut 65. An aperture is drilled into a portion of a lower housing wall 17 which is large enough for receiving the bearing portion 34 of the rotatable shaft assembly 36 with a tight fit. The first U-shaped bracket member 35 is slipped over the lower housing wall 17, and the bearing-receiving apertures 41 are placed in registration with the drilled hole in the lower housing wall 17. Then, the rotatable shaft assembly 36 is passed through the bearing-receiving apertures 41 and the drilled hole in a proximal to distal manner so that the bearing portion 34 of the rotatable shaft assembly 36 is placed in a tight fit with the lower housing wall 17 and the bearing-receiving apertures 41. Then, the driven wheel 38 is attached to the proximal end 40 of the first segment 50 of the rotatable shaft assembly 36, and the trimmer blade unit 42 is attached to the distal end 44 of the second segment 52 of the rotatable shaft assembly 36. A nut 67 is used to attached the driven wheel 38 to the first segment 50, and a washer 69 and nut 71 are used to attach the trimmer blade unit 42 to the second segment 52 of the rotatable shaft assembly 36.

Bolt-receiving apertures 73 are present in the first U-shaped bracket member 35, and bolt-receiving apertures 75 are present in the second U-shaped bracket member 57. Registrable holes are drilled in the lower housing wall 17, and bolts 39 are placed through those holes and the bolt-receiving apertures 73. The nuts 37 are used to secure the first U-shaped bracket member 35 to the lower housing wall 17. Similarly, additional registrable holes are drilled in the lower housing wall 17, and bolts 61 are placed through those holes and the bolt-receiving apertures 75. The nuts 59 are used to secure the second U-shaped bracket member 57 to the lower housing wall 17.

The first telescopic members 60 and the second telescopic members 62 of the adjustable-length strut assembly 58 are adjusted to span the distance between the first U-shaped bracket member 35 and the second U-shaped bracket member 57. The adjustable-length strut assembly 58 serves to stabilize and brace the presence of the trimmer assembly on the lawnmower 11.

After the lawnmower-attached edge trimmer apparatus 10 is installed on the lawnmower 11, the apparatus is ready for operation. Under circumstances when the trimmer blade unit 42 is not in use, the length-adjustment assembly 54 is adjusted so that the first segment 50 is pulled toward the second segment 52. When this is done sufficiently, the driven wheel 38 is pulled off of the driving surface 20 of the combined flywheel and blade assembly 14. When this occurs, the trimmer blade unit 42 is not is driven.

On the other hand, when the trimmer assembly is to be used to trim a sidewalk, driveway, and the like, the length-adjustment assembly 54 is adjusted in a reverse manner so that the first segment 50 is moved away from the second segment 52. When this is done a sufficient amount, the driven wheel 38 is moved into contact with the driving surface 20. In this orientation, when the motor of the lawnmower 11 is in operation, and the drive shaft 12 is rotating, the combined flywheel and blade assembly 14 is in rotation, and the driven wheel 38 is turned by the driving surface 20 of the combined flywheel and blade assembly 14. Rotation of the driven wheel 38 is transmitted through the rotatable shaft assembly 36 to the trimmer assembly causing the trimmer blade unit 42 to rotate.

Figure 1:
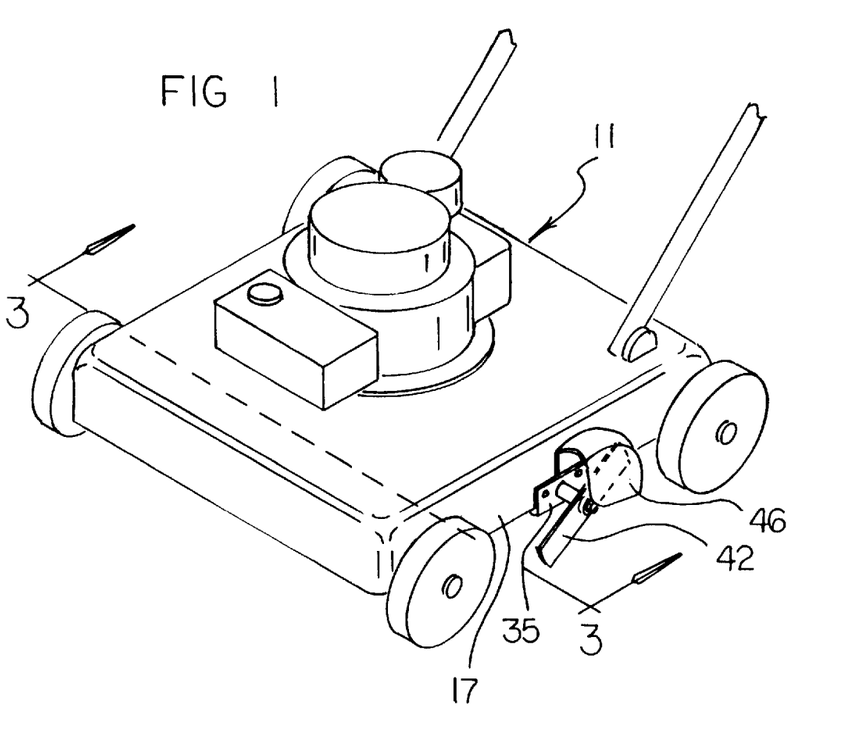
FIG. 1 is a perspective view showing a first embodiment of the lawnmower-attached edge trimmer apparatus of the invention attached to a lawnmower.
Figure 2:
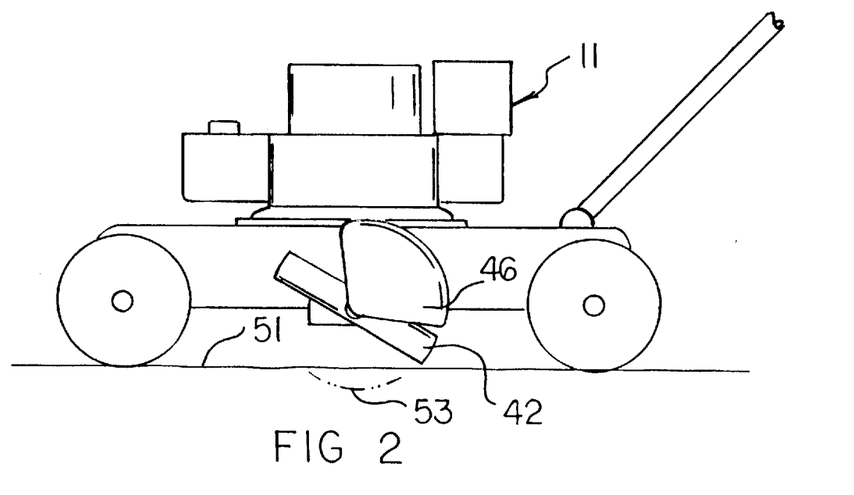
FIG. 2 is a side view of the embodiment of the lawnmower-attached edge trimmer apparatus shown in FIG. 1, also showing a path of cutting of the trimmer blade below ground level.
Figure 3:
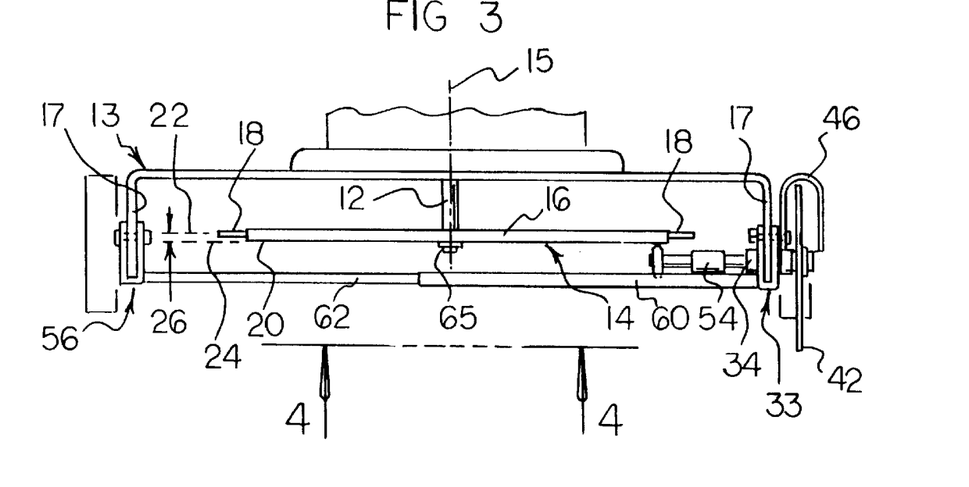
FIG. 3 is a partial cross-sectional view of the embodiment of the lawnmower-attached edge trimmer apparatus of FIG. 1 taken along line 3—3 thereof.
Figure 4:
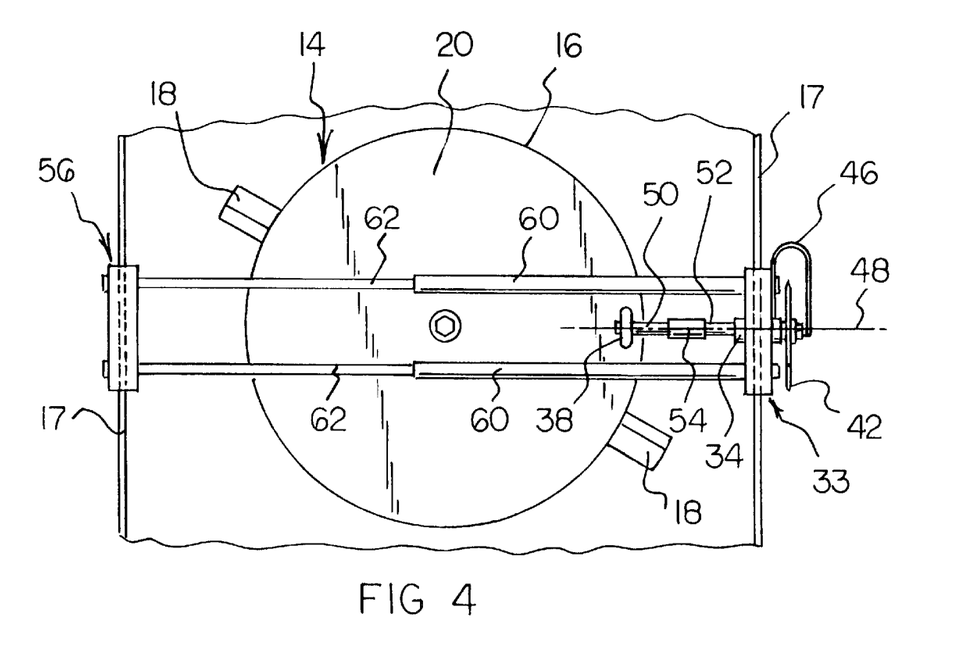
FIG. 4 is a partial bottom view of the embodiment of the invention shown in FIG. 3 taken along line 4—4 thereof.
Figure 5:
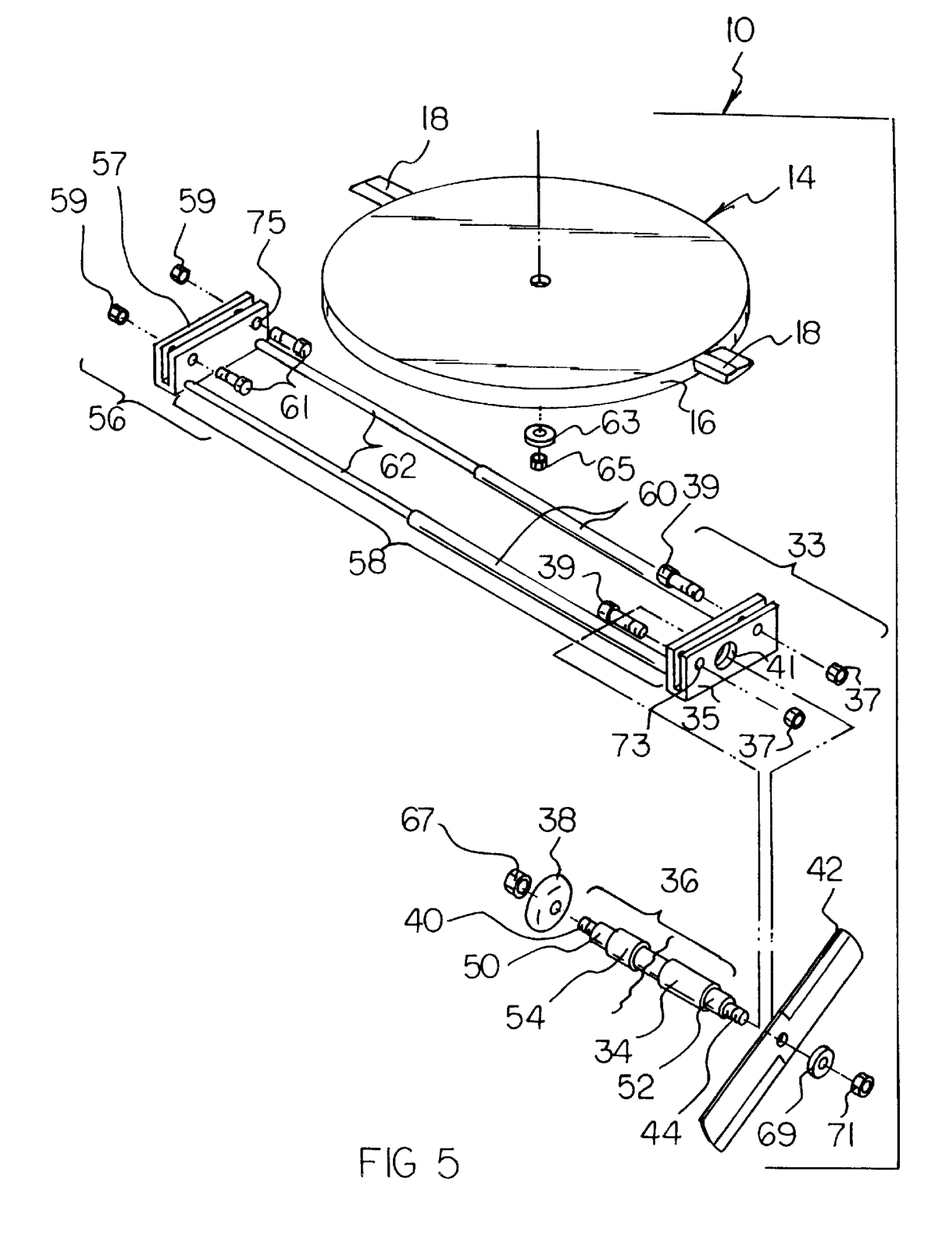
FIG. 5 is an exploded perspective view of the embodiment of the invention shown in FIG. 4.

As shown in FIG. 2, the trimmer blade unit 42 has a sufficiently long radius such that distal portions of the trimmer blade unit 42 move below ground level 51. When this occurs, the trimmer blade unit 42 can perform its trimming function for sidewalks, driveways, and the like. The depth of penetration of the trimmer blade unit 42 into the ground is indicated by curved broken line 53.

The mechanical implementation of the length-adjustment assembly 54 can take a variety of known forms. For example, the first segment 50 and the second segment 52 of the rotatable shaft assembly 36 can be in a form of a well known split shaft. Different lockable positions of the split shaft can be employed. Alternatively, the first segment 50 can be in the form of a threaded bolt, and the second segment 52 can be in the form of a complementary threaded well. A lock nut can be used to lock the first segment 50 into a selected adjustment position with respect to the second segment 52.

It will be appreciated that the combined flywheel blade assembly may be dispensed with in favor of a separate flywheel and blade mounted one above the other on shaft 12 of mower 11. In such optional arrangement, the flywheel preferably will be mounted above the adjustable length strut assembly 58 with the usual lawn mower blade being mounted below the strut assembly as viewed for example in FIG. 3 and with due consideration given to a required lengthening of drive shaft 12.

Further, if desired, a flexible shaft assembly can be interposed between the rotatable shaft assembly 36 and the trimmer blade unit 42. When this is done, a hand-held trimmer assembly can be provided.

In accordance with additional embodiments of the invention, the edge trimmer apparatus includes a drive member supported by the drive shaft 12 above the blade housing 13. A power transmission assembly is connected to the drive member and is supported by the blade housing 13. A trimmer blade unit 42 is supported by and driven by the power transmission assembly.

Figure 6:
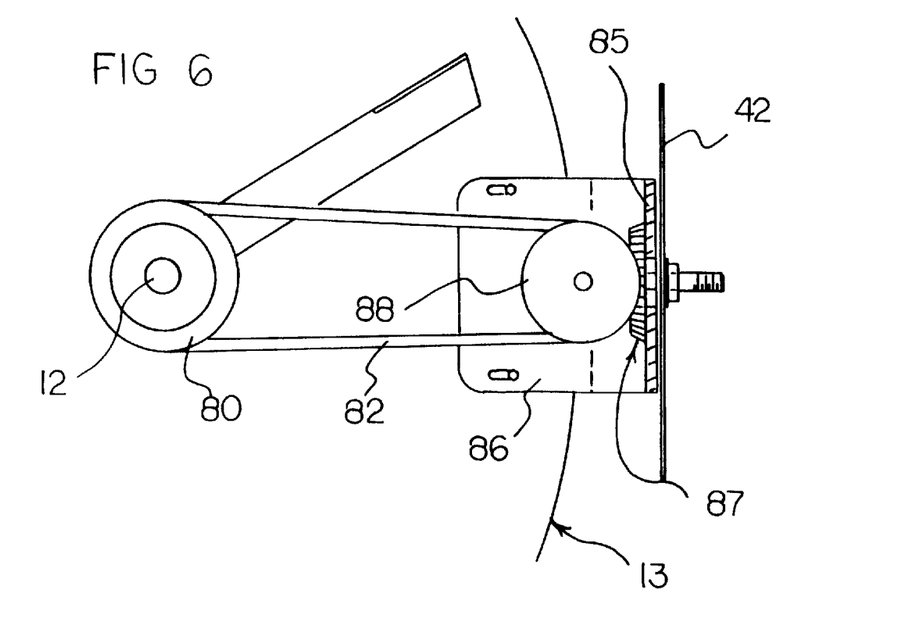
FIG. 6 is a partial top view of a second embodiment of the invention.
Figure 7:
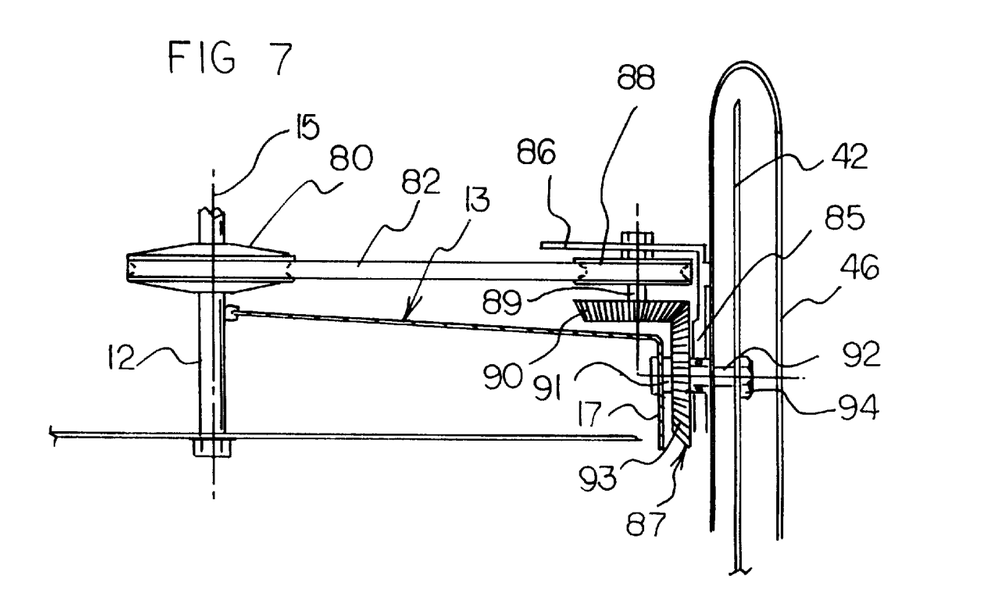
FIG. 7 is a partial side view of the embodiment of the invention shown in FIG. 6.

As shown in FIGS. 6 and 7, the drive member can be a drive pulley 80 supported by the drive shaft 12. The power transmission assembly includes a gear-containing transmission unit supported by the lower housing wall 17 of the blade housing 13. An endless belt 82 is connected between the drive pulley 80 and the gear-containing transmission unit, and a trimmer blade unit 42 is supported by and driven by the gear-containing transmission unit. The gear-containing transmission unit includes a first bevel gear assembly 87 connected to the lower housing wall 17 of the blade housing 13. The first bevel gear assembly 87 supports and drives the trimmer blade unit 42. A pulley/gear transmission support bracket is supported by the first bevel gear assembly 87. The pulley/gear transmission support bracket includes a vertical first bracket portion 85 and a horizontal second bracket portion 86. The vertical first bracket portion 85 is connected to the first bevel gear assembly 87. A driven pulley 88 is supported in an overhead manner by the horizontal second bracket portion 86 of the pulley/gear transmission support bracket. A gear-driving shaft 89 is connected to the driven pulley 88, and a second bevel gear assembly 90 is connected to the gear-driving shaft 89. The second bevel gear assembly 90 is enmeshed with the first bevel gear assembly 87.

The first bevel gear assembly 87 includes a bearing portion 91 connected to the lower housing wall 17 of the blade housing 13. A gear shaft portion 92 is retained by the bearing portion 91 and supports the trimmer blade unit 42,. A first bevel gear 93 is supported by the gear shaft portion 92. A protective shroud 46 is connected to the vertical first bracket portion 85 of the pulley/gear transmission support bracket.

In using the second embodiment of the invention, when the drive shaft 12 of the lawnmower 11 rotates, the drive pulley 80 also rotates. The rotation of the drive pulley 80 causes the endless belt 82 to rotate which causes the driven pulley 88 to rotate. Rotation of the driven pulley 88 causes the gear-driving shaft 89 to rotate which causes the second bevel gear assembly 90 to rotate. Rotation of the second bevel gear assembly 90 causes the enmeshed first bevel gear 93 of first bevel gear assembly 87 to rotate. Rotation of the first bevel gear 93 causes the gear shaft portion 92 to rotate, and rotation of the gear shaft portion 92 causes the trimmer blade unit 42 to rotate. A lock nut 94 is used to lock the trimmer blade unit 42 onto the gear shaft portion 92 of the first bevel gear assembly 87.

Figure 8:
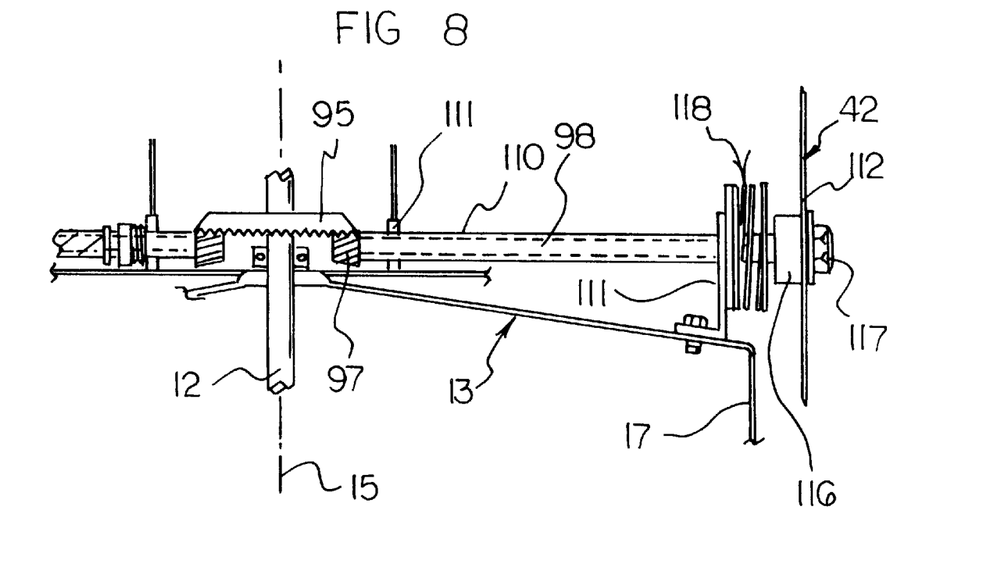
FIG. 8 is a partial side view of a third embodiment of the invention.
Figure 9:
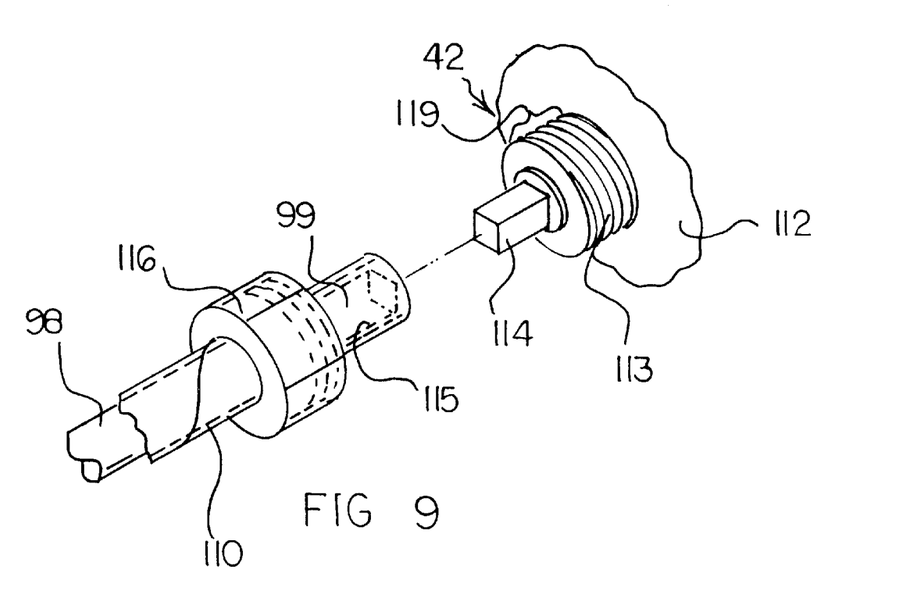
FIG. 9 is an enlarged partial perspective exploded view of a coupling employed in the embodiment of the invention shown in FIG. 8.

In accordance with the third embodiment of the invention shown in FIGS. 8 and 9, the drive member can be a ring gear 95. In this case, the power transmission assembly includes a longitudinal drive shaft assembly supported by the blade housing 13. The longitudinal drive shaft assembly includes a geared end 97 enmeshed with the ring gear 95. A shaft portion 98 extends horizontally from the geared end 97, and a coupler end 99 is located at a distal end of the shaft portion 98. The coupler end 99 is connected to the trimmer blade unit 42. A bearing jacket 110 jackets the shaft portion 98 of the longitudinal drive shaft assembly. Jacket-support brackets 111 support the bearing jacket 110 and are supported by the blade housing 13. The coupler end 99 of the longitudinal drive shaft assembly includes a well portion 115.

The trimmer blade unit 42 includes a blade 112. A rigid key-carrying portion 113 is connected to the blade 112, and a key portion 114 is received in the well portion 115 of the longitudinal drive shaft assembly. The rigid key-carrying portion 113 includes external threads 119. A threaded lock nut 116 is supported by the bearing jacket 110 and engages the external threads 119 of the rigid key-carrying portion 113 of the trimmer blade unit 42 for locking the longitudinal drive shaft assembly to the trimmer blade unit 42. In addition, another lock nut 117 is part of the trimmer blade unit 42 and is used to secure the blade 112 to the rigid key-carrying portion 113 of the trimmer blade unit 42 for locking the longitudinal drive shaft assembly to the trimmer blade unit 42. Spring assembly 118 can be placed between the trimmer blade unit 42 and the longitudinal drive shaft assembly for urging the trimmer blade unit 42 toward the longitudinal drive shaft assembly. The well portion 115 at the end of the longitudinal drive shaft assembly and the key portion 114 of the trimmer blade unit 42 together form a slip shaft.

In using the embodiment of the invention shown in FIGS. 8 and 9, power from the drive shaft 12 is transmitted to the ring gear 95 which rotates. The geared end 97 of the longitudinal drive shaft assembly is caused to rotate by the ring gear 95. The rotation of the geared end 97 is transmitted down the shaft portion 98 to the coupler end 99 and the well portion 115. The key portion 114 of the trimmer blade unit 42 is caused to rotate by the well portion 115 of the longitudinal drive shaft assembly. The key portion 114 causes the rigid key-carrying portion 113 to rotate which causes the blade 112 to rotate.

Figure 10:
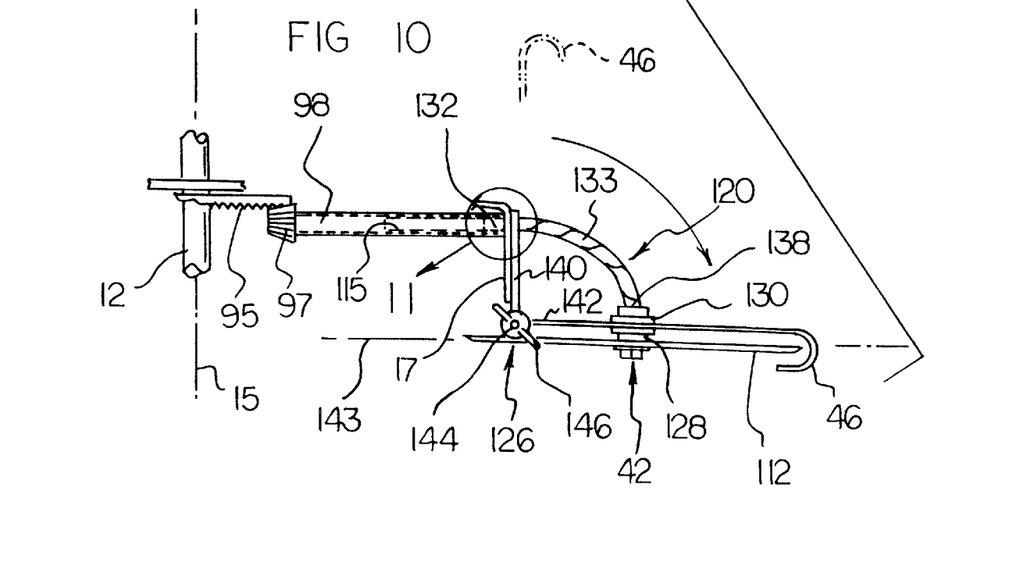
FIG. 10 is a partial elevational view of a fourth embodiment of the invention.
Figure 11:
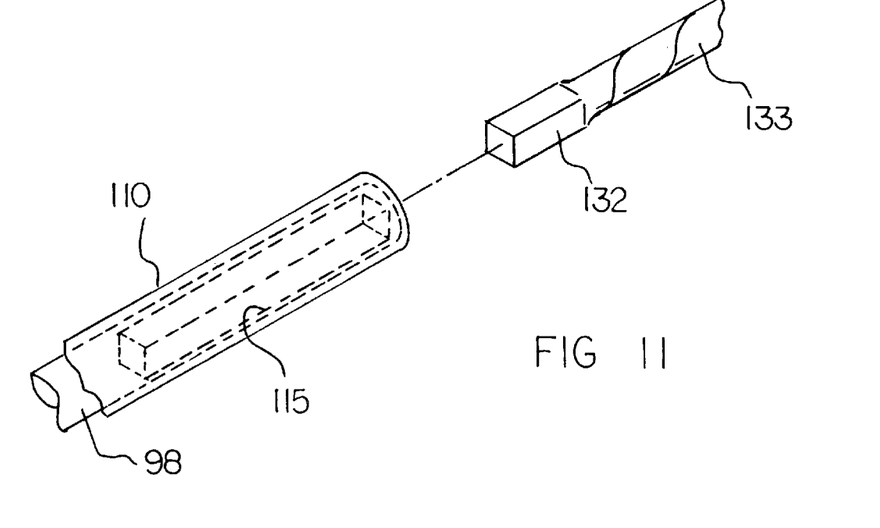
FIG. 11 is an enlarged partial perspective exploded view of a coupling employed in the circled region 11 of FIG. 10.

In accordance with the fourth embodiment of the invention shown in FIGS. 10 and 11, The trimmer blade unit 42 includes a blade 112. A blade-retaining shaft 128 supports the blade 112. A shaft-bearing assembly 130 supports the blade-retaining shaft 128. A flexible power cable assembly 120 is connected to the blade-retaining shaft 128 for connection to the longitudinal drive shaft assembly. A hinged trimmer-unit-support assembly 126 is connected to the lower housing wall 17 of the blade housing 13 and supports the shaft-bearing assembly 130. The blade 112 lies in a blade plane 143.

The flexible power cable assembly 120 includes a proximal end 138 connected to the blade-retaining shaft 128. A flexible cable portion 133 is connected to the proximal end, and a key portion 132 is connected to the flexible cable portion 133. The key portion 132 is received in the well portion 115 of the shaft portion 98 of the longitudinal drive shaft assembly. The longitudinal length of the well portion 115 of the shaft portion 98 of the longitudinal drive shaft assembly is equal to or greater than the combined length of the key portion 132 and the flexible cable portion 133 of the flexible power cable assembly 120.

The hinged trimmer-unit-support assembly 126 includes a fixed support member 140 connected to the lower housing wall 17 of the blade housing 13, a movable support member 142 that supports the shaft-bearing assembly 130, and a hinge pin 144 connecting the fixed support member 140 and the movable support member 142 together, whereby the movable support member 142 can be rotated around the fixed support member 140. An orientation lock 146 is connected between the fixed support member 140 and the movable support member 142 for locking the fixed support member 140 and the movable support member 142 at a selected angular orientation.

In using the fourth embodiment of the invention, the blade 112 can be oriented in substantially any angle of orientation ranging from vertical to horizontal. In FIG. 10, the blade 112 is oriented horizontally. In broken lines, a top portion of protective shroud 46 is oriented vertically. This represents an orientation in which the blade 112 is oriented vertically. To change the orientation of the blade 112, the orientation lock 146 is loosened, the movable support member 142 is rotated around the hinge pin 144 so that the desired angle of orientation between the movable support member 142 and the fixed support member 140 of the hinged trimmer-unit-support assembly 126 is obtained, and the orientation lock 146 is retightened.

It is noted that when the movable support member 142 moves toward the fixed support member 140, the key portion 132 and a distal portion of the flexible cable portion 133 of the flexible power cable assembly 120 move deeper into the well portion 115 of the shaft portion 98 of the longitudinal drive shaft assembly. When the movable support member 142 is substantially parallel to the fixed support member 140, substantially all of the flexible cable portion 133 of the flexible power cable assembly 120 is retained by the well portion 115 of the shaft portion 98 of the longitudinal drive shaft assembly.

Figure 12:
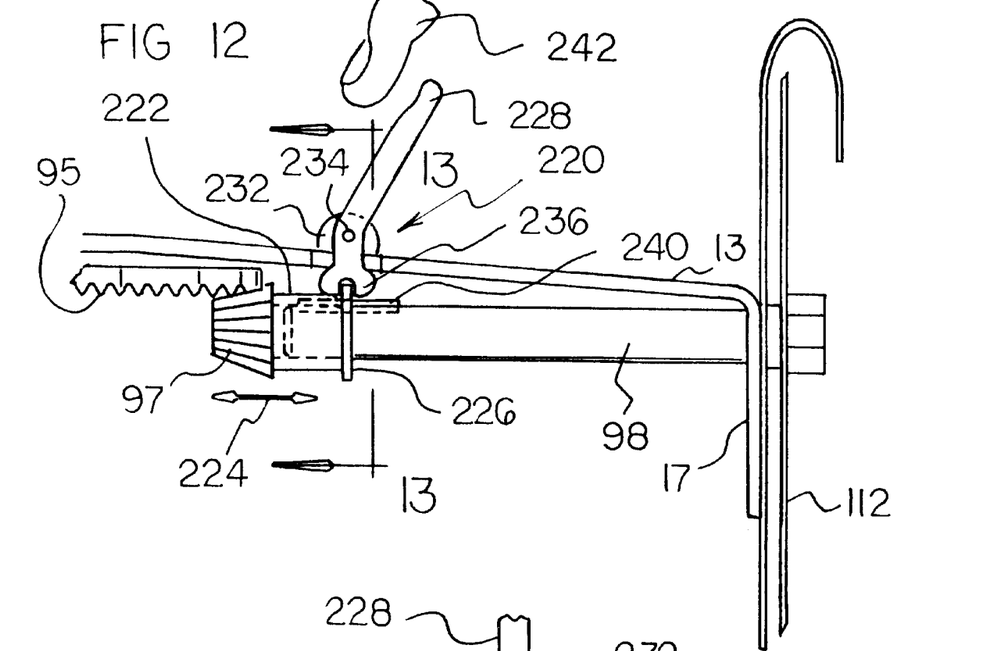
FIG. 12 is a partial elevational view of a fifth alternatively preferred embodiment of the invention showing transmission means for selectively manually controlling the operation of the embodiment of FIGS. 10 and 11.
Figure 13:
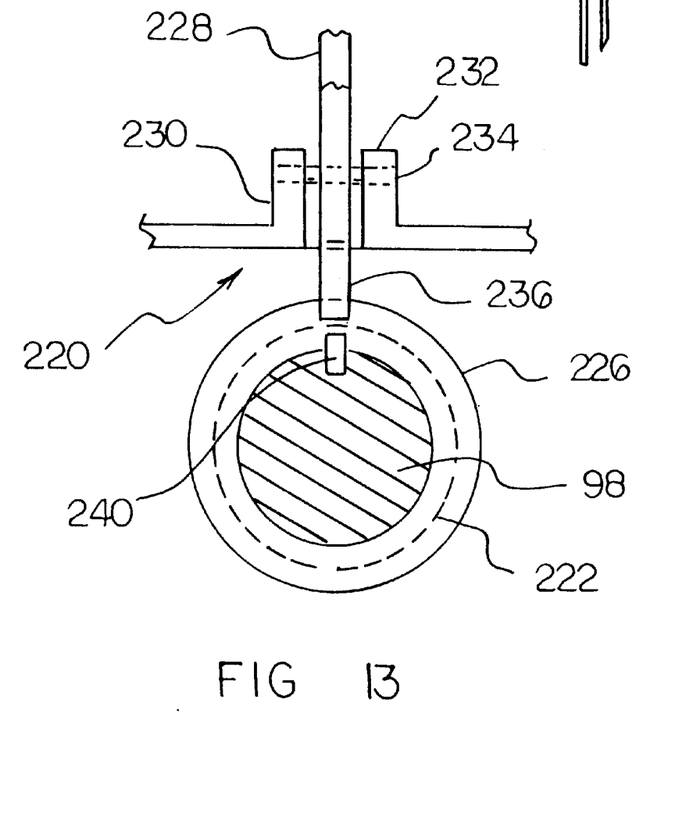
FIG. 13 is a cross-sectional view taken along line 13—13 of FIG. 12.

It is frequently desired to selectively manually control the operation of the blade 112 relative to the main drive shaft 12. For this purpose, an auxiliary transmission means may be provided. Turning to FIGS. 12 and 13, there is shown a preferred auxiliary transmission means comprising a manually actuatable "dog clutch" assembly generally indicated by reference numeral 220. When "dog clutch" assembly 220 is employed, the geared end 97, rather than being directly fixed to an end of longitudinal shaft 98 as described above, instead is carried on a collet 222 loosely fitted over the end of drive shaft 98 and adapted for limited lateral slidable movement parallel to the central axis of shaft 98 as indicated by arrow 224. Collet 222 has a radially enlarged flange or shoulder 226 at the end thereof opposite to geared end 97 substantially as shown. A control lever 228 is pivotally supported on housing 13 by means of a pair of spaced upstanding lugs 230, 232 and transverse pivot pin 234 to permit pivotal movement of the lever relative to the housing and in the direction of arrow 224. The bottom end of lever 228 is in the form of a bifurcation 236 entrained about the outer circumferential edge of shoulder 226 of slidable collet 222. Collet 222, in turn, is fixed against relative rotation on shaft 98 by a key 240 suitably seated in a known manner in complementary grooves in the bore of the collet and on the outer surface of the shaft 98, respectively (see FIG. 13). The key and key grooves are such to permit slidable movement of collet 222 relative to shaft 98 in the direction of arrow 224, all of the while securely affixing the collet to the shaft 98 for rotation therewith about the shaft's central longitudinal axis in a manner believed apparent to those with ordinary skill in this art. As a result of the foregoing arrangement of parts, it will be observed that selective manual movement by an operator (symbolically represented by digit 242) of lever 228 will be effective to cause slidable movement of collet 222 on shaft 98 and concomitantly, cause engagement or disengagement of geared end 97 from ring gear 95 as desired without necessarily cutting power to main blade shaft 12. Thus, in accordance with the present invention, the "dog clutch" assembly 220 of FIGS. 12 and 13, yields increased flexibility of operation by assuring independent control of rotation of the main mower blade and the trimmer blade 112, and renders even more safe the operation of the disclosed apparatus.

Figure 14:
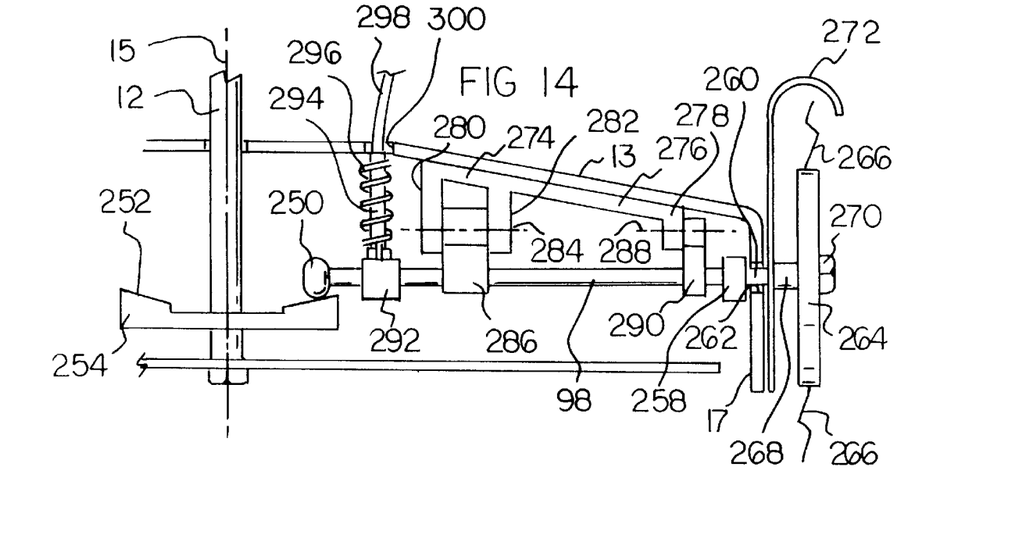
FIG. 14 is a partial elevational view of a sixth alternatively preferred embodiment of the invention showing a simplified power transmission assembly coupled between the trimmer assembly and a friction drive assembly with the driven member of the transmission assembly being mounted above the drive assembly.
Figure 15:
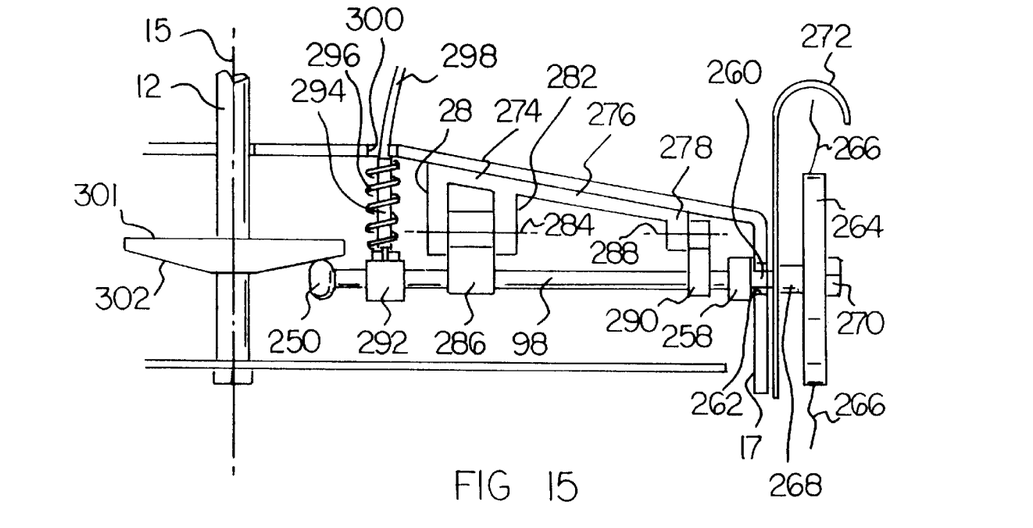
FIG. 15 is a partial elevational view of a variation of the sixth alternatively preferred embodiment of the invention showing the driven member of the transmission assembly being mounted below the drive assembly.

FIGS. 14 and 15 show a sixth alternatively preferred embodiment comprising a simplified version of the invention wherein the power transmission assembly comprises a fixed shaft mounted on a bracket assembly supported between the drive wheel assembly and the trimmer assembly. In this alternative embodiment, the power transmission assembly includes a longitudinal drive shaft assembly supported by the blade housing 13. The longitudinal drive shaft assembly includes at its proximal end a friction drive roller 250 engaging the beveled upper annular surface 252 of friction drive wheel 254 which latter is suitably fixed to shaft 12 for rotation therewith. A shaft portion 98 extends horizontally from the drive roller end, and a bearing block or coupler end 258 is located at the opposed other distal end of the shaft portion 98. The bearing block or coupler end 258 is suitably connected to the trimmer assembly by means of shaft extension 260 extending through an opening 262 in lower side wall 17. In this embodiment, the edger assembly is a trimmer assembly of the filament type and preferably includes a hub assembly 264 having the well known flexible filaments 266 extending radially therefrom substantially as shown. The hub assembly, in turn, is coupled to a bushing 268 via fastener 270 which bushing is suitably connected to shaft extension 260 extending through opening 262. A removable protective shroud 272 for the hub assembly and filaments may optionally be suitably supported on the outer surface of lower side wall 17.

Figure 19:
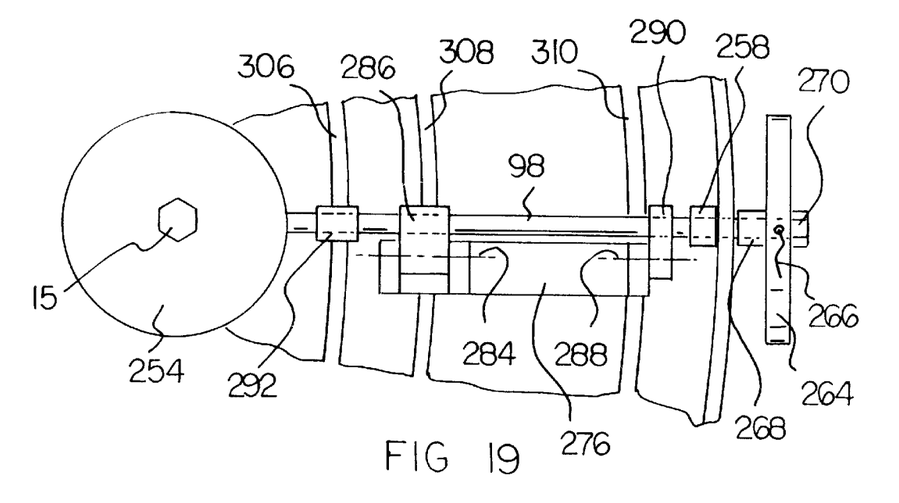
FIG. 19 is a partial bottom view of the alternatively preferred embodiment of FIGS. 16–18.

In accordance with this alternative preferred form of the invention, shaft 98 is supported for rotation about its central longitudinal axis by a bracket assembly which includes a proximal bifurcated inboard portion 274, a central portion 276 and a distal end portion 278. Bifurcated portion 274 includes first and second flanges 280, 282, respectively, for defining a first journal bearing axis 284 for a first cantilever bearing block 286 orthogonally connected to drive shaft portion 98 whereas distal end portion 278 defines a second journal bearing axis 288 for a second cantilever bearing block 290 orhtogonally connected to drive shaft portion 98 at a longitudinally spaced location substantially as shown. Cantilever bearing blocks 286, 290 are suitably journaled to the bracket assembly bifurcated portion and end portion, respectively, so that shaft portion 98 may be supported by the bracket assembly yet be permitted to rotate about axes 284, 288. See also FIG. 19. The bracket assembly is suitably affixed to the underside of the housing 13 substantially in the position illustrated preferably by a multiplicity of nuts and bolts, or other well known fasteners, (not shown) extending through central portion 276 and the confronting portion of housing 13.

Coupled to shaft portion 98 between drive roller 250 and first cantilever bearing block 286, via bearing block 292, is a cable control assembly comprising an upstanding (vertical) post 294, a spiral compression spring 296, and a control cable 298 suitably connected to the top end of post 294 through opening 300 in housing 13. Control cable 298 extends to a conventional ratchet-type cable release control (not shown) mounted on the handle bar or other remote location of the mower so that actuation thereof by an operator is effective selectively to cause up and down movement of bearing block 292 between first and second positions, a first position where spring 296 urges drive roller 250 into engagement with rotating friction wheel surface 252 and a second position where the cable is tensioned sufficiently to compress the spring and cause upward movement of bearing block 292 sufficiently to disengage friction drive roller 250 from drive surface 252. By the foregoing arrangement, it will be appreciated that the transfer or application of rotational energy between the drive wheel (flywheel) 254 and the trimmer assembly via the power transmission assembly selectively may be manually controlled by an operator of the lawn mower.

In FIG. 15, there is shown an arrangement similar to FIG. 14, but for the drive roller 250 on shaft portion 98 being located below the friction drive wheel 301 in engagement with lower beveled annular surface 302. Hence, selective operation of cable 298 by an operator is effective to cause up and down movement of bearing block 292 between first and second positions, a first position where drive roller 250 is urged into engagement with rotating friction wheel surface 302 against the compressive force of spring 296, and a second position where the cable is relaxed sufficiently to enable the compression spring to cause downward movement of bearing block 292 sufficiently to disengage the friction drive roller from drive wheel bottom surface 302.

Figure 16:
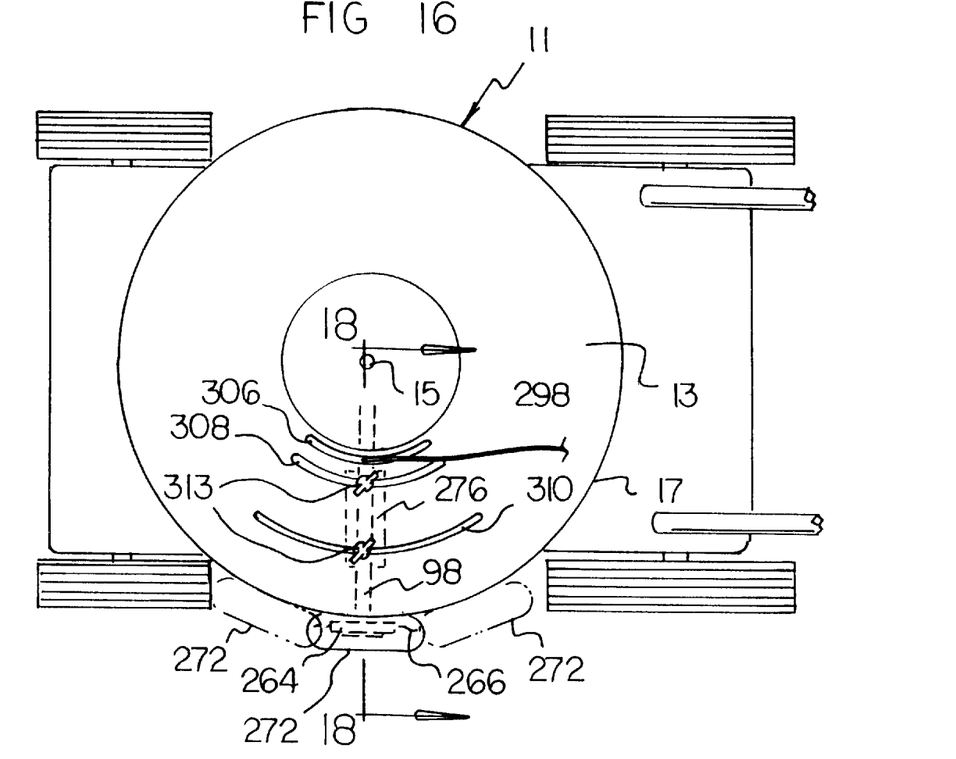
FIG. 16 is a top plan view of a lawnmower including a seventh alternatively preferred embodiment of the invention wherein the trimmer assembly includes means for adjusting the angular relation of the trimmer assembly in azimuth relative to the lawn mower housing.
Figure 17:
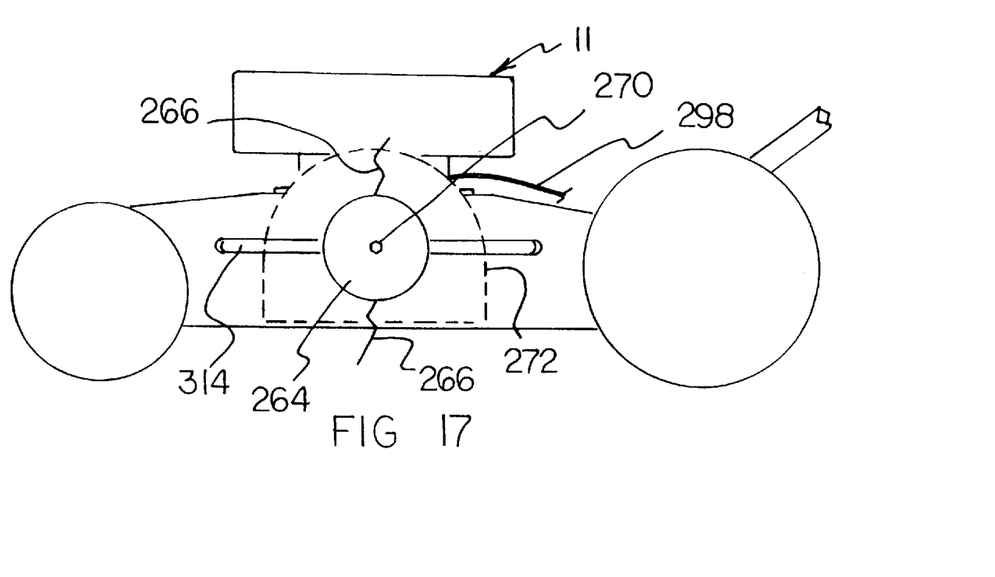
FIG. 17 is an elevational view of the alternative embodiment of FIG. 16.
Figure 18:
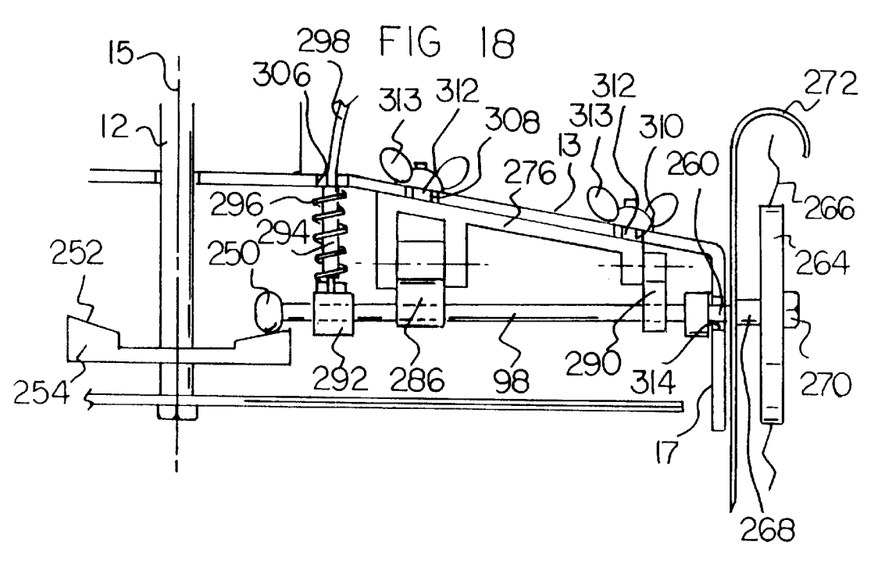
FIG. 18 is a partial elevational view of the alternatively preferred embodiment of FIGS. 16 and 17 invention showing power transmission assembly and its bracket assembly.

Turning now to FIGS. 16–19 there is illustrated a variation of the embodiment of FIGS. 14 or 15 wherein the power transmission assembly and the edger/trimmer assembly are both mounted on the frame of the lawn mower in such a manner as to have an azimuth adjustment capability. Thus, as best seen in FIG. 16, the trimmer assembly, bracket assembly, and cable assembly are adapted for adjustable movement relative to the frame of the mower about the lawnmower's main central blade rotation axis 15. In order to accomplish such adjustable movement, a series of arcuate slots at different radial distances from the central axis 15 are provided in the top wall of frame 13. First arcuate slot 306 located proximal to axis 15 has control cable 298 of the cable assembly extending therethrough. Second and third arcuate slots 308 and 310, situated at greater radial distances, respectively, from main axis 15 have extending therethrough externally threaded stud bolts 310 preferably attached integrally to central portion 276 of the bracket assembly. Matingly affixed to the upstanding ends of the stud bolts are complementary internally threaded wing nuts 313. A fourth arcuate slot 314 is provided in the side wall of frame 17 to allow passage of the shaft extension 260 distally located on shaft portion 98. It will be appreciated that by loosening wing nuts 313, the entire trimmer assembly and bracket assembly units are capable of being slidingly adjusted within the range defined by arcuate slots 306, 308, 310 and 314 azimuthly relative to axis 15 and then affixed in place at a desired adjusted angular orientation merely by retightening the wing nuts sufficiently with the extent or range of such movement being indicated for example, by the dashed outline showing the extreme positions of the trimmer edger assembly in FIG. 16. By azimuthly adjusting the trimmer assembly in accordance with the invention as described above, variations in the width of cut afforded by the trimmer assembly selectively may be controlled, thus creating a more efficient mowing/edging/trimming process. As mentioned above, a protective shroud 272 optionally may be provided as shown by the dashed-line outline in FIG. 17 suitably affixed to the sidewall to protect the hub and filaments of the trimmer assembly. The shroud will be removably mounted so that it may easily be removed and then re-affixed after adjustment of the desired azimuth angle of the trimmer assembly.

The components of the lawnmower-attached edger or trimmer apparatus of the invention can be made from inexpensive and durable metal, plastic and other suitable known materials. In this regard, it will be especially advantageous to fabricate all or a portion of gear 95, geared end 97 or friction drive roller 250 from hard rubber materials or the like as this will help to minimize vibration and noise.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved lawnmower-attached edge trimmer apparatus that is low in cost, relatively simple in design and operation, and which may advantageously be used without using a drive belt. With the invention, a lawnmower-attached edge trimmer apparatus is provided which does not operate by using a spring or a pivoted connection assembly. With the invention, an auxiliary cutting apparatus is provided which does not employ trimmer blades that are in constant motion, even when the trimmer blades are not being used for trimming. With the invention, a lawnmower-attached edge trimmer apparatus is provided which can be retrofitted to a conventional lawnmower. With the invention, a lawnmower-attached edge trimmer apparatus is provided which can be adjusted to a variety of sizes of lawnmower housings.

The terms "edger" and "trimmer" are used throughout this specification to refer broadly to an assembly attached to a lawnmower for affecting an auxiliary cutting process with respect to that carried out by the main lawnmower blade. Hence, the terms "edger" and "trimmer" are to be construed interchangeably.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Accordingly, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. An edge trimmer apparatus attached to a lawnmower which has a drive shaft and a blade housing which has a lower housing wall, wherein the drive shaft rotates around a longitudinal axis, comprising:
    a drive member supported by the drive shaft,
    a power transmission assembly connected to said drive member and supported by the blade housing, and
    a trimmer blade unit supported by and driven by said power transmission assembly,
wherein said trimmer blade unit includes:
    a blade,
    a blade-retaining shaft supporting said blade,
    a shaft-bearing assembly supporting said blade-retaining shaft,
    a flexible power cable assembly connected to said blade-retaining shaft for connection to said longitudinal drive shaft assembly, and
    a hinged trimmer-unit-support assembly, connected to the lower housing wall of the blade housing, for supporting said shaft-bearing assembly.

* * * * *